United States Patent
Ruemelin et al.

(10) Patent No.: US 9,946,374 B2
(45) Date of Patent: Apr. 17, 2018

(54) METHOD FOR RECEIVING AN INPUT ON A TOUCH-SENSITIVE PANEL

(71) Applicant: Bayerische Motoren Werke Aktiengesellschaft, Munich (DE)

(72) Inventors: Sonja Ruemelin, Munich (DE); Christopher Roelle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 103 days.

(21) Appl. No.: 14/574,541

(22) Filed: Dec. 18, 2014

(65) Prior Publication Data
US 2015/0103028 A1 Apr. 16, 2015

Related U.S. Application Data

(63) Continuation of application No. PCT/EP2013/063524, filed on Jun. 27, 2013.

(30) Foreign Application Priority Data

Jun. 28, 2012 (DE) .......... 10 2012 211 163

(51) Int. Cl.
*G06F 3/041* (2006.01)
*G06F 3/048* (2013.01)
(Continued)

(52) U.S. Cl.
CPC .............. *G06F 3/041* (2013.01); *G06F 3/016* (2013.01); *G06F 3/0488* (2013.01); *G06F 2203/04809* (2013.01)

(58) Field of Classification Search
CPC ........ G06F 3/0488; G06F 3/041; G06F 3/016; G06F 2203/04809
See application file for complete search history.

(56) References Cited

U.S. PATENT DOCUMENTS

2007/0063980 A1* 3/2007 Eich ............... G06F 3/0219
345/173
2009/0079550 A1* 3/2009 Makinen ............ G06F 3/016
340/407.2
(Continued)

FOREIGN PATENT DOCUMENTS

| EP | 1 014 295 A2 | 6/2000 |
|---|---|---|
| EP | 1 103 883 A2 | 5/2001 |

OTHER PUBLICATIONS

Mertens et al., "Design Pattern TRABING: Touchscreen-based Input Technique for People Affected by Intention Tremor," Proceedings of the $2^{nd}$ ACM Sigchi Symposium on Engineering Interactive Computing Systems, 2010, pp. 267-272, New York, New York (XP055051992).

(Continued)

Primary Examiner — Ariel Balaoing
(74) Attorney, Agent, or Firm — Crowell & Moring LLP

(57) ABSTRACT

A method is provided for receiving an input on a touch-sensitive field, wherein the field is set up to determine the location of a touch of the field by a user's finger, wherein the touch-sensitive field includes a tactile threshold. The threshold is arranged such that at least one area of the touch-sensitive field lies on each side thereof. The method detects a movement of the user's finger on the touch-sensitive field which crosses the threshold, and activates a function in response to the detection.

20 Claims, 2 Drawing Sheets

(51) Int. Cl.
   *G06F 3/01*      (2006.01)
   *G06F 3/0488*    (2013.01)

(56) References Cited

U.S. PATENT DOCUMENTS

| | | | |
|---|---|---|---|
| 2009/0160813 A1 | 6/2009 | Takashima et al. | |
| 2009/0273563 A1 | 11/2009 | Pryor | |
| 2010/0073303 A1* | 3/2010 | Wu | G06F 3/0485 |
| | | | 345/173 |
| 2010/0122194 A1* | 5/2010 | Rogers | G06F 3/04817 |
| | | | 715/769 |
| 2013/0082947 A1* | 4/2013 | Chang | G06F 1/1643 |
| | | | 345/173 |

OTHER PUBLICATIONS

International Search Report (PCT/ISA/210) dated Oct. 9, 2013, with English translation (six (6) pages).

German Search Report dated Jan. 22, 2013, with partial English translation (nine (9) pages).

* cited by examiner

METHOD FOR RECEIVING AN INPUT ON A TOUCH-SENSITIVE PANEL

CROSS REFERENCE TO RELATED APPLICATIONS

This application is a continuation of PCT International Application No. PCT/EP2013/063524, filed Jun. 27, 2013, which claims priority under 35 U.S.C. §119 from German Patent Application No. 10 2012 211 163.8, filed Jun. 28, 2012, the entire disclosures of which are herein expressly incorporated by reference.

BACKGROUND AND SUMMARY OF THE INVENTION

The invention relates to a method for receiving an input on a touch-sensitive panel and a device for said purpose.

Today, uniformly flat touch-sensitive panels for automobiles are known, which panels are subdivided into different areas in a field and, optionally, labeled. The touching of an area activates a function associated with this area, such as the initiation of a call, starting of the navigation system or calling-up of a menu of functions.

These prior art systems have the drawback that they cannot be operated without directing one's gaze at the touch-sensitive panel. To do this, the driver of an automobile must take his eyes off the road, which carries an increased risk of collision.

It is the object of the invention to provide a method for receiving an input on a touch-sensitive panel, in which one's gaze need not be directed at the touch-sensitive panel field in order to activate a certain function.

In a method according to the invention for receiving an input on a touch-sensitive panel, the panel is configured to determine the location of a touch of the panel field by a user's finger. The touch-sensitive field includes a tactile threshold, the threshold being arranged such that at least one area of the touch-sensitive field lies on both sides of it. The method includes: Detection of a movement of the user's finger on the touch-sensitive field, which movement crosses the threshold, and the activation of a function in response to the detection.

According to the method according to the invention, users are offered a threshold on the touch-sensitive field that they can feel. This threshold can be identified by the user by feel without having to divert one's gaze from the road. The input for the touch-sensitive field then occurs in relation to the felt threshold, namely by crossing the threshold with the finger. The user's gaze need not be diverted from the road for this, either. By crossing the felt threshold, the user activates the function. The method according to the invention offers similar advantages as a typical recessed or protruding button in an automobile that can be identified and activated by feel without visual contact. One typical example of such buttons are pre-configured station buttons on a traditional automobile radio wherein the pre-configured station buttons can be blindly felt and selected. The method according to the invention can help make favorite functions or information quickly available without eye contact. The crossing of the threshold is seen by some as being analogous to the pressing of a button or the clicking with a mouse.

The touch-sensitive panel can be one that is based on optical, resistive or capacitive touch detection, or it can be based on acoustic surface waves, and is often referred to as a touch pad. The touch-sensitive panel can include the touch-sensitive layer of a touch-sensitive screen (often also called a touch screen) and be based on this technology. The touch-sensitive panel can have a substantially level or curved surface. The touch-sensitive panel can be implemented by a touch screen.

The tactile threshold can be made available by various devices. These can be structures made of acryl, silicon or rubber that are, in fact, physically applied to the touch-sensitive panel and extend beyond a surface of the touch-sensitive panel. However, the tactile threshold can also be made available by a device that uses electronic charges to generate a resistance that is perceptible to the user and gives the user the impression of a threshold. Devices of this type are offered, for example, by Senseg, Espoo, Finland as "Senseg Tixel." The tactile threshold can also be referred to as a haptic barrier and can guide the user's finger when feeling blindly.

The activated function can be a function that is not directly perceptible to the user, such as an internal function, for example the outputting of a signal that the threshold has been crossed. On the other hand, the function can be perceptible to the user, such as the calling-up of a program or the navigation system, the initiation of a telephone call, or the starting of an app, for example.

The crossing movement can be defined by a touch of the user's finger initially exclusively or substantially exclusively in an area of the field on one side of the threshold and then exclusively or substantially exclusively in an area of the field on the other side of the threshold. A provision can be made that only the crossing of the threshold in a certain direction leads to the activation of the function. That is, it is detected that the threshold is crossed in a certain direction. Only then is the function activated. Furthermore, a provision can be made that only the crossing of the threshold at a point which lies in a predetermined section of the threshold leads to an activation of the function. That is, it is detected that the threshold is crossed at a point which lies in a predetermined section. Only then is the function activated. The function can be associated with the location of the threshold and/or the section of the threshold.

In an advantageous development, the method includes the displaying of a representation associated with the function in the vicinity of the threshold on a display or adjacent to the threshold on a display. The representation can be a pictogram or icon that makes reference to the associated function, or simply lettering which names or explains the function. In this way, the user is shown which function is activated upon crossing of the threshold. The user can memorize this function and then activate it without visual contact using the touch-sensitive panel. The display of the representation is particularly advantageous if the function is freely selectable.

In an advantageous development, the method includes the detection of a touch in an area of the panel field adjacent to the threshold, and the changing of the associated representation, particularly emphasizing the associated representation, in response to the detection of the touch in an area of the field adjacent to the threshold. The representation can thus change its appearance—for example, it can become larger or provided with a shadow—if a touch, optionally also a fast touch, of a finger on the touch-sensitive field is detected. In particular, the method includes the changing of the associated representation as long as a touch is detected in an area of the field adjacent to the threshold. This means that the representation is only emphasized as long as the touch occurs in the adjacent area. In other words, as long as the user's finger is touching the field in the area—referred to by some as "hovering"—the representation is emphasized.

In a preferred method, the detection of a movement crossing the threshold is the detection of a movement of a finger on the touch-sensitive panel which crosses a first predetermined place; and the activation of the function associated with the threshold is the activation of a first function in response to the detection of the fact that the threshold has been crossed at the first place. Simultaneously, the preferred method also includes the following steps: Detection of a movement of a finger on the touch-sensitive panel field which crosses the threshold at a second predetermined place; activation of a second function in response to the detection of the fact that the threshold has been crossed at the second place. With the aid of this method, the user is given the opportunity to choose between different functions. The crossing of the threshold at the first place activates the first function, and the crossing of the threshold at the second place activates the second function. The first and second place can be comprised by a respective first predetermined and second predetermined section of the threshold, the respective crossing of which activates the first and second function, respectively. Expressed in another way, the first function is associated with the first section and the second function is associated with the second section of the threshold. This is another way of saying that each point on the threshold in the first section is associated with the first function, and each point of the threshold in the second section is associated with the second function. Therefore, not only crossing at a place activates the associated function, but rather the same function can be activated by crossing at several places, namely at all places lying in the corresponding section of the threshold.

In addition, the preferred method includes the displaying of a first representation associated with the first function which is spatially allocated to the first place of the threshold on a display and the displaying of a second representation associated with the second function which is spatially allocated to the second place of the threshold on a display. The spatial allocation can be achieved by arranging the respective representation adjacent to the respective place, or at least closer to the respective place, than the other representation. In this way, the user is shown visually what place on the threshold needs to be crossed with the finger in order to activate the desired function. Thus, the user can identify intuitively which place on the threshold activates which function. This can be useful, above all, if the user is able to establish which functions are to be activated upon crossing certain places on the threshold or if the functions associated with the places change—depending on other conditions, for example.

The preferred method can further include: Detecting that a touch is in an area of the panel field adjacent to the first place on the threshold or in an area of the field adjacent to the second place on the threshold; changing of the representation associated with the first function in response to the detection that the touch is in an area of the field adjacent to the first place on the threshold; changing of the representation associated with the second function in response to the detection that the touch is in an area of the field adjacent to the second place on the threshold. The representations can thus be changed upon occurrence of a touch or fast touch in the area of the respective place or the respective section of the threshold; for example, it can be enlarged or provided with shadows. The user is thus given the opportunity to learn the correlation between touch and function.

Likewise, the preferred method can further include: Detection of a touch in an area of the panel field adjacent to the first place of the threshold or in an area of the field adjacent to the second place of the threshold; changing of the first associated representation for as long as a touch is detected in the area of the field adjacent to the first place; changing of the second associated representation for as long as a touch is detected in the area of the field adjacent to the second place. This has the effect that the corresponding representation is emphasized as long as the user's finger is touching the corresponding area. If the user's finger is no longer touching the corresponding area, the representation is no longer emphasized. As a result, the user is clearly shown the correlation between the touched area and the associated place on the threshold and its assigned function.

In an advantageous development, the threshold is a first threshold. Moreover, an area of the panel field on one side of the threshold which is adjacent to the first place on the threshold and an area of the field on the same side of the threshold which is adjacent to the second place are separated by a tactile threshold. In this way, the user is offered a tactile threshold between the places on the threshold, the crossing over of which activates different functions. The user can thus find the place on the threshold that is associated with the function that they would like to activate. In this way, the user need not direct his gaze to the touch-sensitive field in order to find the corresponding place on the threshold. The adjacent areas can have a size that corresponds to only a small part of the size of the touch-sensitive panel. Each area can have a size with a respective area of the threshold in common, the crossing over of which activates the respectively associated function. In particular, each area can have a rectangular shape. Also advantageously, the additional threshold extends perpendicular to the first threshold and/or is adjacent thereto.

If representations associated with the functions are displayed, these representations can be changed in their appearance if a touch occurs in the area adjacent to the respective place. For example, if a user touches the area adjacent to the first place, the representation associated with the first function can be changed. This symbolizes to the user once again in an intuitive manner which function would be activated if he were to cross the threshold at the respective place.

Advantageously, the touch-sensitive panel is also comprised by a touch-sensitive display, such as a touch-sensitive screen, often also referred to as a touch screen. The representations associated with the functions, as well as the touch-sensitive panel, can thus be realized by a single touch screen, whereby the user is offered a uniform appearance of the input device.

A device according to the invention for receiving an input on a touch-sensitive panel includes the touch-sensitive panel field, wherein the field is set up to determine the location of a touch of the field by a user's finger. The touch-sensitive field is arranged such that at least one area of the touch-sensitive field lies on each side thereof. An electronic processor is configured to execute the method according to the invention.

In an advantageous development of the device, the threshold is a first threshold and the device further includes a display and an additional tactile threshold. An area of the panel field on one side of the threshold which is adjacent to the first place on the threshold and an area of the field on the same side of the threshold which is adjacent to the second place are separated by an additional tactile threshold. Furthermore, the device is set up to execute the advantageous or preferred developments of the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
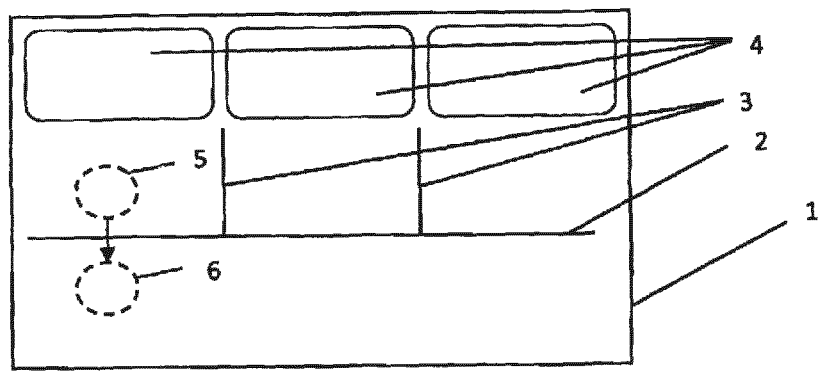
FIG. 1 shows an exemplary embodiment of a touch screen set up according to the invention.

FIG. 1 shows an exemplary embodiment of a touch screen 1 according to the invention. It comprises a tactile threshold 2 constituting a haptic barrier. Moreover, the touch screen 1 has additional tactile thresholds 3, which separate areas of the touch screen field 1 from each other and also divide the threshold 2 into sections. FIG. 1 shows two thresholds 3 bearing the same reference symbol 3. A different function is associated with every single section of the threshold 2 which, in turn, is associated with one of the representations 4. Each representation 4 is spatially associated with the corresponding section of the threshold 2. FIG. 1 shows three representations 4 bearing the same reference symbol 4. The representations 4 give the user an indication of which function is associated with the respective section of the threshold. The user first touches the touch screen 1 with his finger, whereby the touch or contact surface 5 with the touch screen 1 is established. Next, the user moves his finger as indicated by the arrow, so that the finger finally has the touch or contact surface 6 with the touch screen 1. With this movement, the user's finger crosses the threshold 2 at a place or location which is comprised by the left section of the threshold 2. The function associated with this place on, or this section of, the threshold is thus activated. If the user's finger crosses places which lie in other sections of the threshold 2, the functions associated with the respective other sections are activated.

The tactile thresholds 3 enable the user, without eye contact, to find the respective area of the field 1 through touching or feeling with which section of the threshold 2 the desired function is associated. The area above the threshold is also referred to as a hover surface. The area below the threshold is also referred to as the activation surface. The user can count off the individual sections or areas by feel and thereby identify the desired section or area that corresponds to the desired function.

Figure 2:
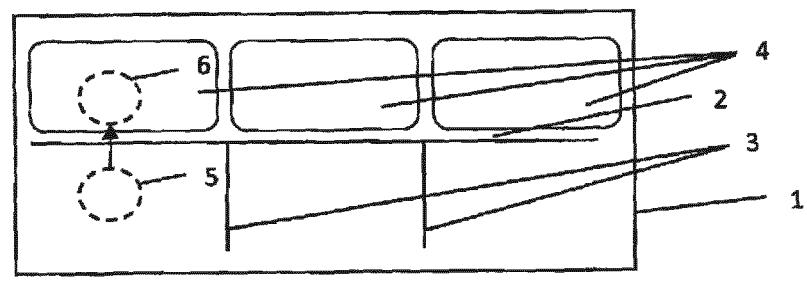
FIGS. 2 and 3 show additional exemplary embodiments of touch screens set up according to the invention.

FIG. 2 shows another exemplary embodiment of a touch screen 1 set up according to the invention. The same reference symbols as in FIG. 1 designate elements with the same function. According to the example of FIG. 2, a movement from below to above leads to an activation of the function. A different drawing direction thus leads to activation here.

Figure 3:
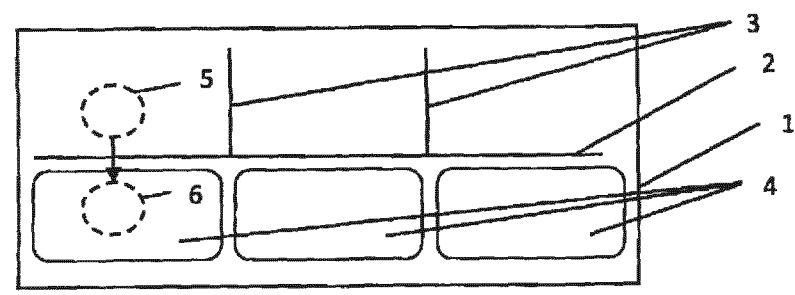

FIG. 3 shows another exemplary embodiment of a touch screen 1 set up according to the invention. The same reference symbols as in FIG. 1 designate elements with the same function. Here, crossing from above downward leads to the activation of the function. The example of FIG. 3 represents a compromise between the metaphor of the pressing-down of a physical button and the non-covering of the representations 4 by the interacting finger.

Figure 4:
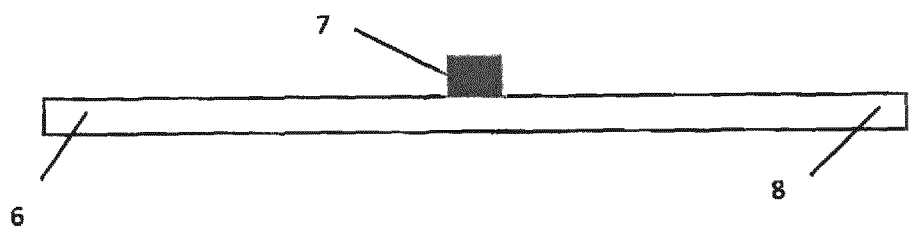
FIG. 4 shows the schematic construction of a touch screen set up according to the invention in a sectional view.

FIG. 4 shows the schematic construction of a touch screen set up according to the invention in a sectional view. The hover surface of the touch screen is identified by reference symbol 6 and the surrounding area. The activation surface of the touch screen is identified by reference symbol 8 and the surrounding area. Reference symbol 7 shows a physical threshold or haptic barrier in a sectional view.

Figure 5:
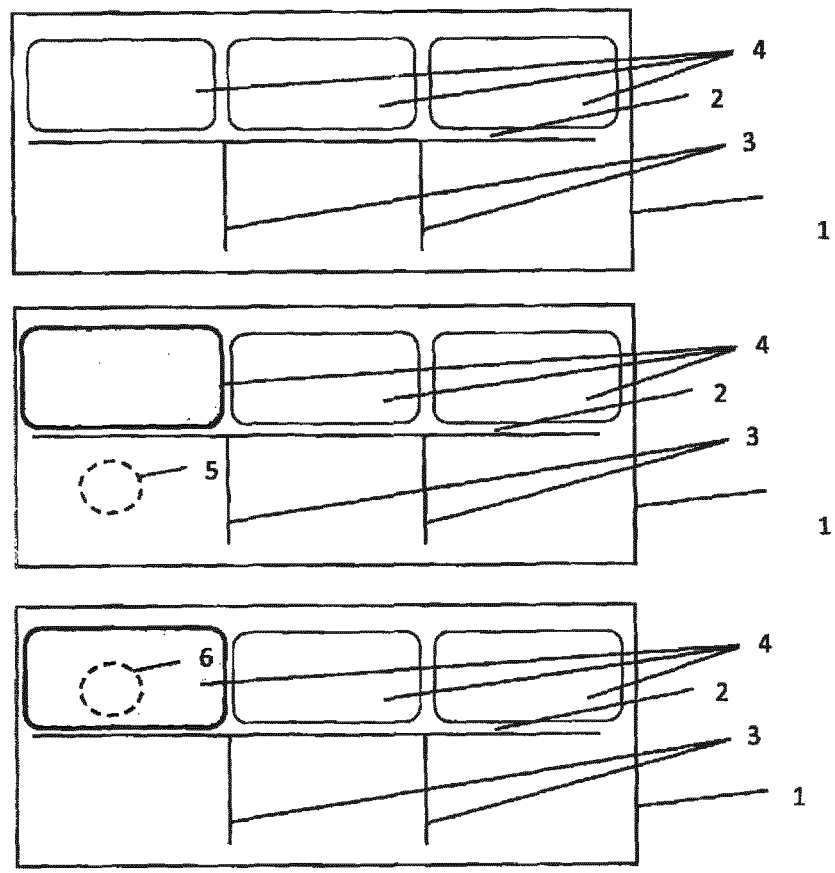
FIG. 5 shows a touch screen set up according to the invention in various phases during the activation of a function.

FIG. 5 shows a touch screen 1 according to the invention in various phases during the activation of a function. The same reference symbols as in FIG. 2 designate elements with the same function. In the uppermost image, no touching of the touch screen 1 is occurring yet. In the middle image, the user's finger is touching the touch screen on the contact surface 5. The representation 4 belonging to the corresponding section of the threshold 2 is emphasized by a thicker border and enlargement, among other things. In the lowermost image, the user's finger has crossed the threshold 2 and is now touching the touch screen on the contact surface designed by 6. The function associated with the crossed-over section of the threshold 2 is activated. This visual function preview facilitates for the user the visual exploration of the touch screen and the sections of the threshold 2 and functions associated with the respective sections.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for receiving an input on a touch-sensitive panel, the method comprising the acts of:
   providing a field of the touch-sensitive panel configured to determine a location of a touch of the field by a user's indicator, the touch-sensitive field comprising a tactile threshold arranged such that at least one area of the touch-sensitive field lies on each side of the tactile threshold;
   detecting a movement of the user's indicator on the touch-sensitive field, which movement crosses the tactile threshold; and
   activating a function in response to the detecting of the movement crossing the tactile threshold.

2. The method according to claim 1, further comprising the act of:
   displaying a representation associated with the function in: (i) a vicinity of the threshold on the display or (ii) adjacent to the threshold on the display.

3. The method according to claim 2, further comprising the acts of:
   detecting a touch of the user's indicator in an area of the field adjacent to the threshold;
   changing the associated representation in response to the detecting of the touch in the area of the field adjacent to the threshold.

4. The method according to claim 3, wherein the act of changing the associated representation comprises an emphasizing of the associated representation for the user.

5. The method according to claim 3, wherein act of the changing the associated representation is continued only so long as the touch is detected in the area of the field adjacent to the threshold.

6. The method according to claim 1, wherein:
the detection of the movement crossing the threshold includes the detection of a movement of the user's indicator on the touch-sensitive field crossing the threshold at a first predetermined place,
the activation of the function includes an activation of a first function in response to the detection of the crossing at the first predetermined place, and
wherein the method further comprises the acts of:
detecting a movement of the user's indicator on the touch-sensitive field crossing the tactile threshold at a second predetermined place, and
activating a second function in response to the detecting of the movement crossing at the second predetermined place.

7. The method according to claim 6, further comprising the acts of:
displaying a first representation associated with the first function on a display, which displayed first representation is spatially associated with the first predetermined place on the threshold; and
displaying a second representation associated with the second function on a display, which second representation is spatially associated with the second predetermined place on the threshold.

8. The method according to claim 7, further comprising the acts of:
detecting a touch of the user's indicator in an area of the field adjacent to the first predetermined place on the threshold or in an area of the field adjacent to the second predetermined place on the threshold;
changing the first representation in response to the detecting of the touch in the area of the field adjacent to the first predetermined place on the threshold; and
changing the second representation in response to the detecting of the touch in the area of the field adjacent to the second predetermined place on the threshold.

9. The method according to claim 7, further comprising the acts of:
detecting a touch of the user's indicator in an area of the field adjacent to the first predetermined place on the threshold or in an area of the field adjacent to the second predetermined place on the threshold;
changing the first representation for as long as the touch is detected in the area of the field adjacent to the first predetermined place on the threshold; and
changing the second representation for as long as the touch is detected in the area of the field adjacent to the second predetermined place on the threshold.

10. The method according to claim 6, wherein:
the tactile threshold is a first tactile threshold; and
an area of the field on one side of the first tactile threshold which is adjacent to the first predetermined place on the tactile threshold and an area of the field on the same side of the tactile threshold adjacent to the second predetermined place are separated by a second tactile threshold.

11. The method according to claim 8, wherein:
the tactile threshold is a first tactile threshold; and
the area of the field adjacent to the first predetermined place on the first tactile threshold and the area of the field adjacent to the second predetermined place on the first tactile threshold lie on a same side and are separated by a second tactile threshold.

12. The method according to claim 10, wherein the second tactile threshold extends perpendicular to the first tactile threshold and/or is adjacent thereto.

13. The method according to claim 11, wherein the second tactile threshold extends perpendicular to the first tactile threshold and/or is adjacent thereto.

14. The method according to claim 1, wherein the touch-sensitive panel comprises a touch-sensitive display panel.

15. A device for receiving an input from a user, the device comprising:
a touch-sensitive panel having a touch-sensitive field, the field being configured so that a location of a touch by a user's indicator is determinable;
the touch-sensitive field comprising a tactile threshold; and
wherein the tactile threshold is arranged such that at least one area of the touch-sensitive field lies on each side of the tactile threshold; and
an electronic processor coupled with the touch-sensitive panel, the processor executing a program to:
detect movement of the user's indicator on the touch-sensitive field, which movement crosses the tactile threshold; and
activate a function in response to the detection of the movement crossing the movement crossing the tactile threshold.

16. The device according to claim 15, further comprising:
a display operatively configured to display a representation associated with the function in a vicinity of the tactile threshold or adjacent to the tactile threshold.

17. The device according to claim 16, wherein the tactile threshold is a first tactile threshold, the device further comprising:
a second tactile threshold, wherein:
an area of the field on one side of the first tactile threshold which is adjacent to a first predetermined place on the first tactile threshold and an area of the field on a same side of the tactile threshold which is adjacent to a second predetermined place on the first tactile threshold are separated by the second tactile threshold.

18. A method for receiving an input on a touch-sensitive panel, the method comprising:
providing a curved field of the touch-sensitive panel configured to receive the input;
providing at least one tactile threshold protruding from the field to form a haptic barrier between at least two areas of the field, the tactile threshold configured to guide the input along a plurality of sections on the field;
detecting the input across the tactile threshold on a section of the plurality of sections;
activating a predetermined function associated with the section and the direction of the input across the tactile threshold.

19. The method according to claim 1, further comprising
detecting a touch in an area of the panel field adjacent to the tactile threshold; and
emphasizing an associated representation, in response to the detection of the touch in an area of the panel field adjacent to the tactile threshold, wherein
the emphasizing includes at least one of a change in size and an appearance of a shadow, and
the emphasizing is responsive to touches of different speeds.

20. The device according to claim 15, wherein
a touch is detected in an area of the panel field adjacent to the tactile threshold; and
an associated representation is emphasized, in response to the detection of the touch in an area of the panel field adjacent to the tactile threshold, wherein the associated representation is emphasized by at least one of a change in size and an appearance of a shadow, and the associated representation is emphasized in response to touches of different speeds.

\* \* \* \* \*